(12) United States Patent
Jorgovanovic

(10) Patent No.: US 10,064,184 B1
(45) Date of Patent: Aug. 28, 2018

(54) DYNAMIC CLIENT ROUTING FOR VIDEO STREAMING CLIENTS

(71) Applicant: Amazon Technologies, Inc., Seattle, WA (US)

(72) Inventor: Milos Jorgovanovic, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 15/164,161

(22) Filed: May 25, 2016

(51) Int. Cl.
| | | |
|---|---|---|
| *H04W 72/04* | (2009.01) | |
| *H04W 72/10* | (2009.01) | |
| *H04B 17/318* | (2015.01) | |
| *H04W 88/08* | (2009.01) | |
| *H04W 84/12* | (2009.01) | |

(52) U.S. Cl.
CPC ...... *H04W 72/0453* (2013.01); *H04B 17/318* (2015.01); *H04W 72/0486* (2013.01); *H04W 72/10* (2013.01); *H04W 84/12* (2013.01); *H04W 88/08* (2013.01)

(58) Field of Classification Search
CPC ............. H04W 72/0453; H04W 72/10; H04W 72/0486; H04W 88/08; H04W 84/12; H04B 17/318
See application file for complete search history.

(56) References Cited

U.S. PATENT DOCUMENTS

| 2006/0276180 | A1* | 12/2006 | Henry, Jr. | ............. H04M 15/00 455/412.2 |
| 2015/0098392 | A1* | 4/2015 | Homchaudhuri | ..... H04W 48/20 370/329 |
| 2016/0242059 | A1* | 8/2016 | Lopes | ................... H04W 24/02 |
| 2017/0164387 | A1* | 6/2017 | Lou | ................... H04W 72/1252 |

FOREIGN PATENT DOCUMENTS

WO     WO 2010014031 A1 * 2/2010 ............. B66C 13/40

OTHER PUBLICATIONS

Calix Residential Gateway Wi-Fi Best Practices Guide [online], Calix, Jun. 2015 [retrieved on Oct. 16, 2017]. Retrieved from the Internet <URL: https://sunprairieutilities.com/image/filecollections/Wi-Fi_Best%20Practices.pdf>, pp. 1-118.*

* cited by examiner

*Primary Examiner* — Omar J Ghowrwal
(74) *Attorney, Agent, or Firm* — Pierce Atwood LLP

(57) ABSTRACT

Devices, systems and methods are disclosed for allowing a media device to select a preferred configuration and send instructions to a remote device to connect to the media device using the preferred configuration. For example, the media device may choose between a direct configuration (e.g., media device communicates with the remote device directly via a first wireless network associated with the media device) or an indirect configuration (e.g., media device communicates with the remote device via a second wireless network associated with an external access point).

(Continued)

The media device may select the preferred configuration based on data rates and/or airtime values determined based on the first wireless network and the second wireless network.

20 Claims, 9 Drawing Sheets

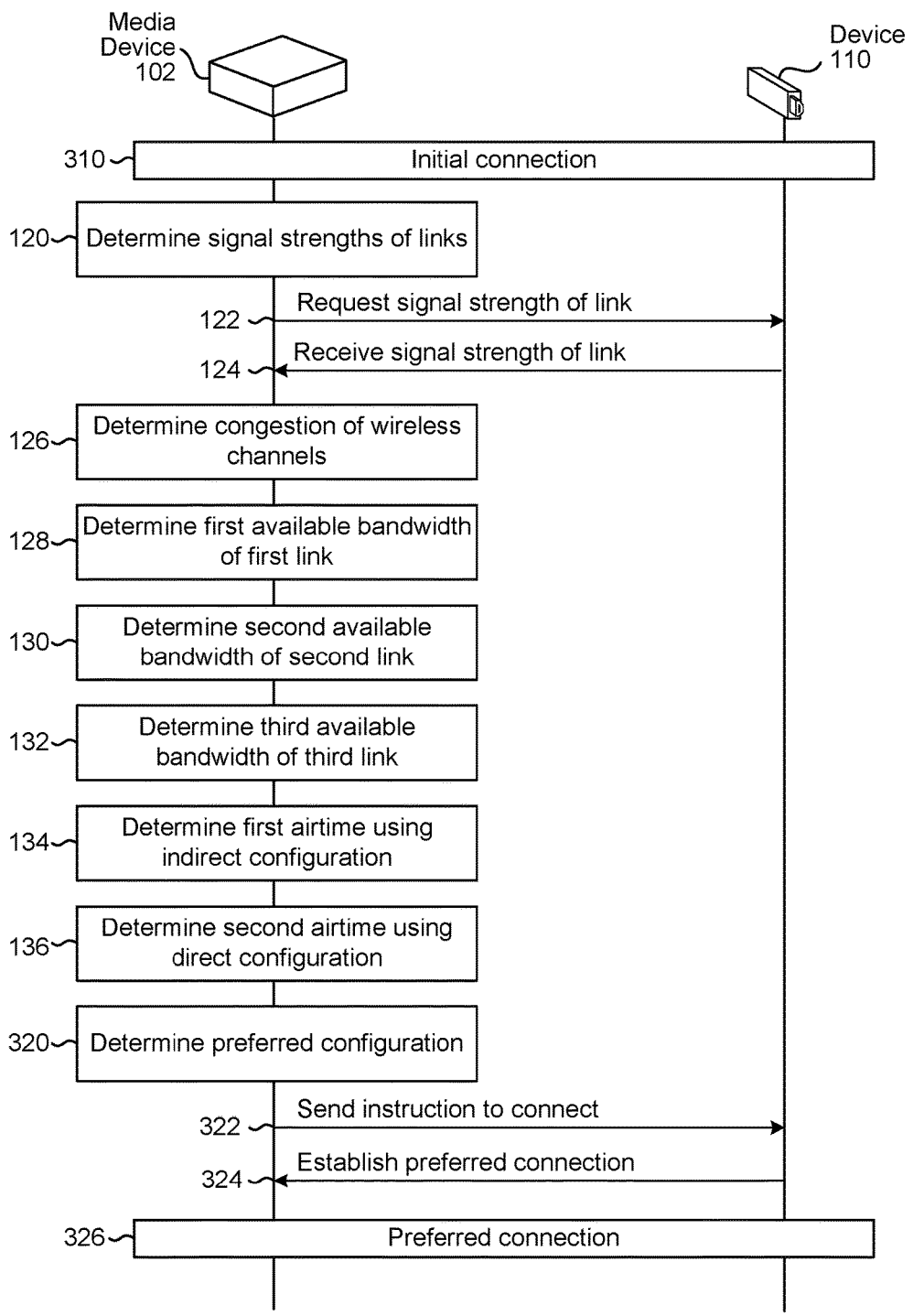

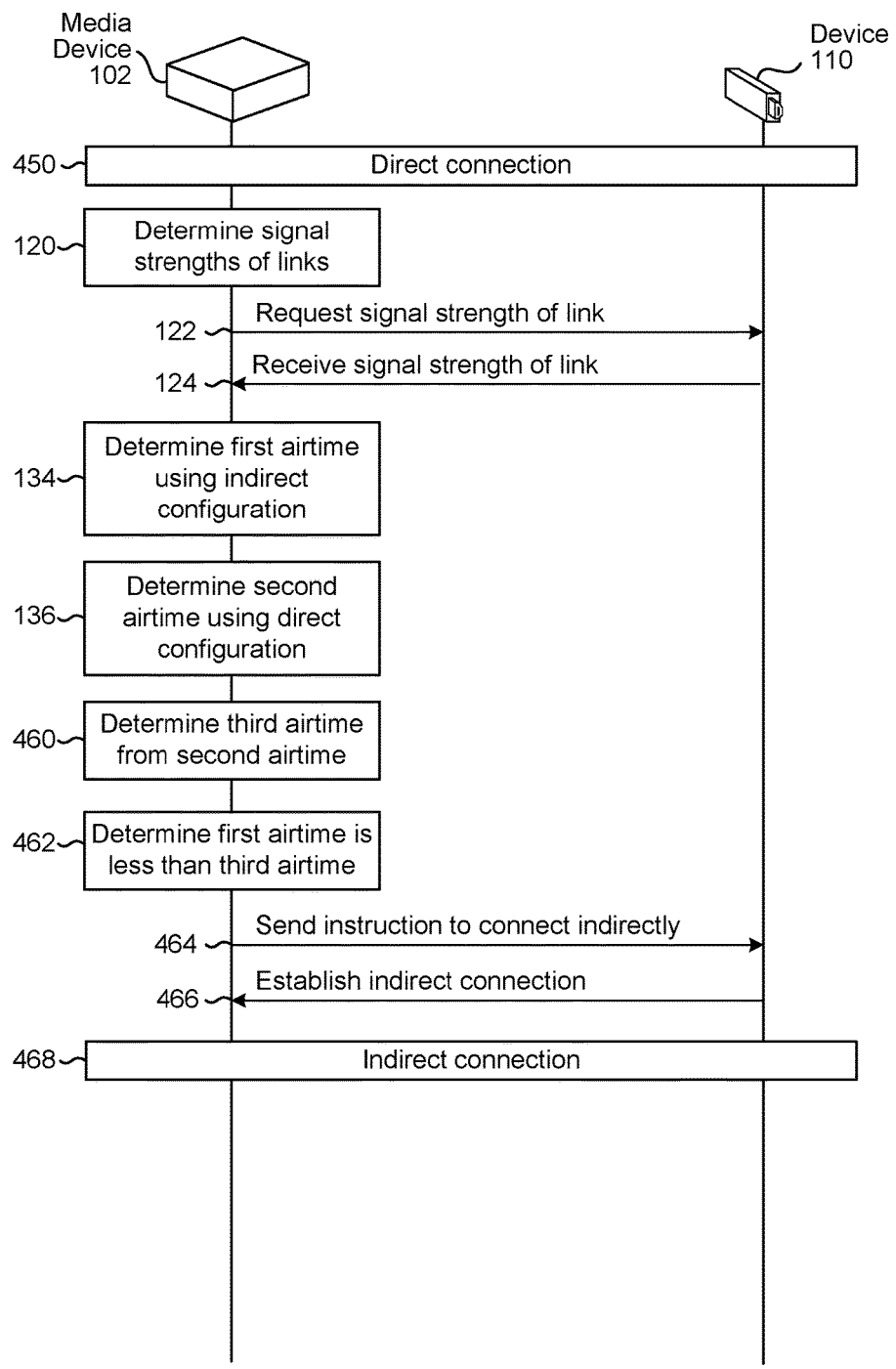

US 10,064,184 B1

DYNAMIC CLIENT ROUTING FOR VIDEO STREAMING CLIENTS

BACKGROUND

With the advancement of technology, the use and popularity of electronic devices has increased considerably. Electronic devices are commonly used to wirelessly connect to networks using network devices such as access points.

BRIEF DESCRIPTION OF DRAWINGS

For a more complete understanding of the present disclosure, reference is now made to the following description taken in conjunction with the accompanying drawings.

FIG. 3 is a communication diagram that illustrates establishing a preferred connection according to embodiments of the present disclosure.

FIGS. 4A-4B are communication diagrams that illustrate modifying a preferred connection according to embodiments of the present disclosure.

DETAILED DESCRIPTION

Electronic devices are commonly used to connect to wireless networks using network devices such as access points. For example, a remote device may connect to a first wireless network associated with an access point and may stream video data from a media device that is also connected to the first wireless network. Due to multiple devices being connected to the first wireless network, resulting in congestion, and/or due to network characteristics associated with the first wireless network (e.g., a 2.4 GHz frequency band may have a lower data rate than a 5 GHz frequency band), a data rate between the remote device and the media device may be low and negatively impact a user experience.

To increase the data rate between the remote device and the media device and therefore improve the user experience, devices, systems and methods are disclosed that provide a second wireless network associated with the media device and dynamically instructs the remote device to connect to the media device via the first wireless network or the second wireless network based on data rates available. For example, the media device may monitor the first wireless network and the second wireless network to determine an amount of congestion associated with the first wireless network and/or the second wireless network, may determine signal strengths between the media device, the access point and the remote device and may determine data rates (e.g., MB/s) and/or airtime values (e.g., length of time to send a MB of data) associated with the first wireless network and the second wireless network.

Figure 1:
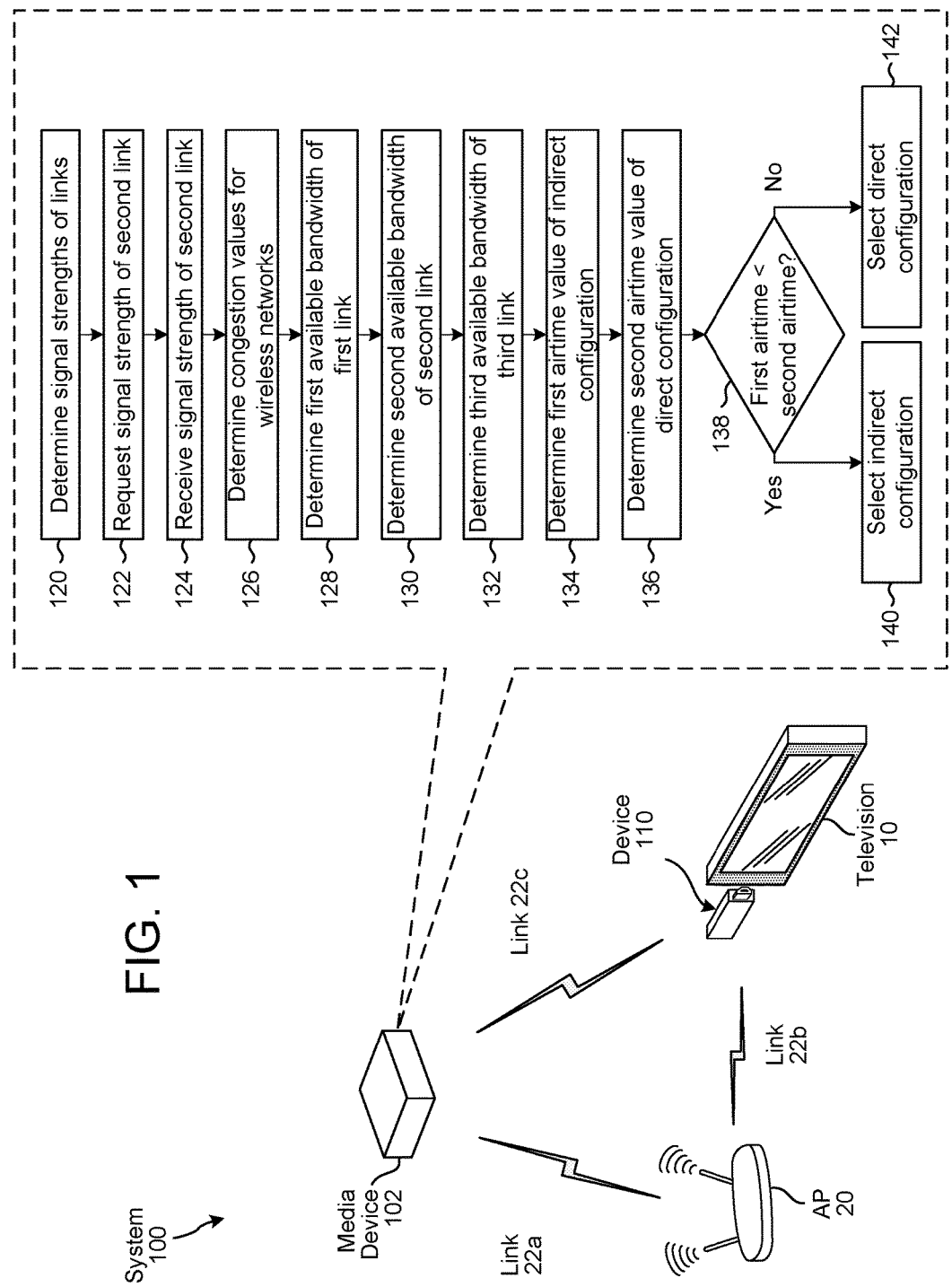
FIG. 1 illustrates a system for communicating between devices using multiple networks according to embodiments of the present disclosure.

FIG. 1 illustrates an overview of a system 100 for implementing embodiments of the disclosure. The system 100 includes a media device 102, a network device such as an access point (AP) 20, a device 110 and a television 10. The device 110 may stream video data from the media device 102 and may send the video data to the television 10 to be displayed.

Figure 2B:
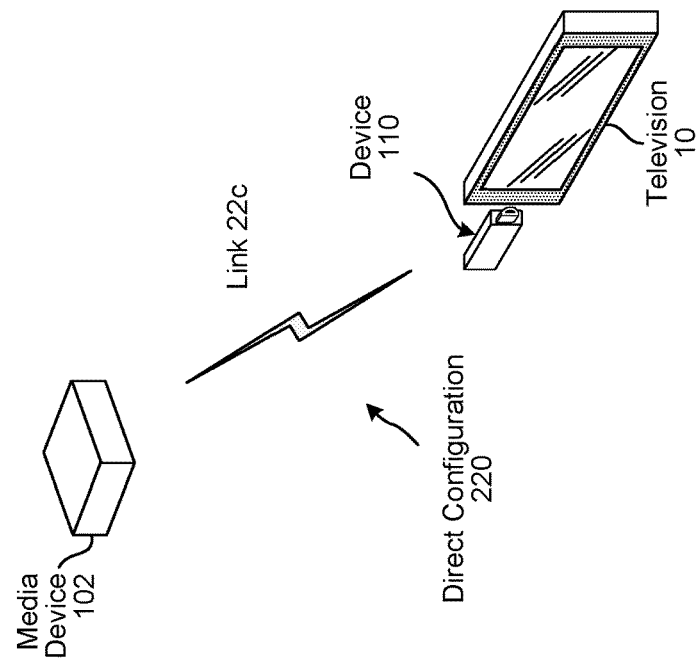
FIGS. 2A-2B illustrate configurations for communicating between devices according to embodiments of the present disclosure.
Figure 2A:
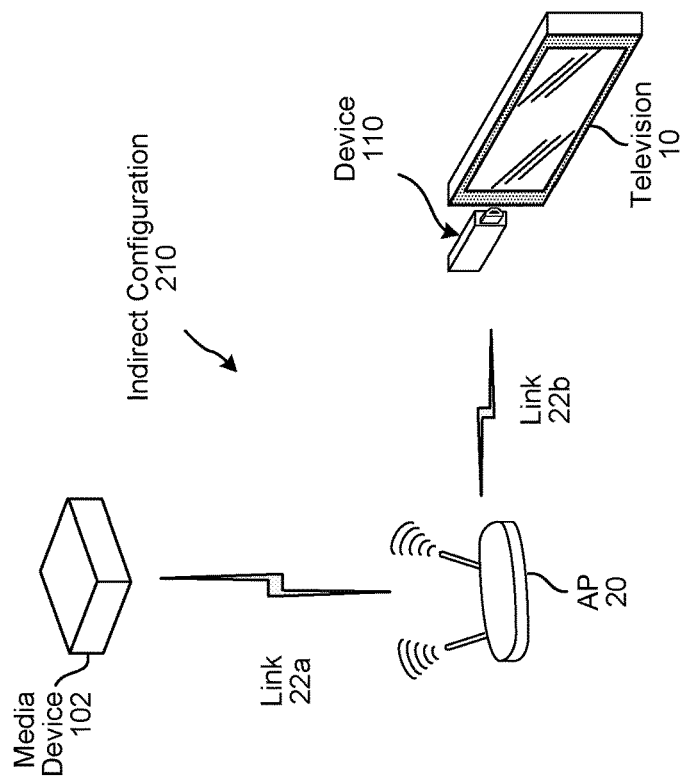

A connection between two devices may be referred to as a communication link. Thus, the media device 102 may be connected with the AP 20 via a first communication link 22a, the AP 20 may be connected with the device 110 via a second communication link 22b and the media device 102 may be connected with the device 110 via a third communication link 22c. As illustrated in FIGS. 2A-2B, the media device 102 may communicate with the device 110 indirectly using an indirect configuration 210 (e.g., via the first communication link 22a and the second communication link 22b) or directly using a direct configuration 220 (e.g., via the third communication link 22c).

The media device 102 may have access point capability and may generate a first wireless network. Thus, the device 110 may communicate directly with the media device 102 via the third communication link 22c by connecting to the first wireless network. The AP 20 may generate a second wireless network. Thus, the media device 102 and the device 110 may communicate via the second communication link 22b and the third communication link 22c when both the media device 102 and the device 110 are connected to the second wireless network.

In some examples, the first wireless network may be associated with a first frequency (e.g., a 5 GHz frequency band) and the second wireless network may be associated with a second frequency (e.g., a 2.4 GHz frequency band). However, the disclosure is not limited thereto and the first wireless network and/or the second wireless network may be associated with the first frequency and/or the second frequency without departing from the present disclosure. Additionally or alternatively, the media device 102 and/or the AP 20 may have dual band capability, enabling the media device 102 and/or the AP 20 to generate a wireless network associated with the first frequency and a wireless network associated with the second frequency. While the examples above mention 2.4 GHz/5 GHz frequency bands, the present disclosure is not limited thereto and the frequency bands may vary.

If the first wireless network is associated with the first frequency and the second wireless network is associated with the second frequency, the first wireless network and the second wireless network may have different network characteristics. For example, the 5 GHz frequency band may offer higher data rates and less congestion (e.g., more open channels) compared to the 2.4 GHz frequency band, but the 2.4 GHz frequency band may offer an extended range compared to the 5 GHz frequency band. Additionally or alternatively, due to additional devices connected to the second wireless network, the first wireless network may offer less congestion than the second wireless network.

In order to improve latency and video resolutions associated with sending video data from the media device 102 to the device 110, the media device 102 may determine data rates (e.g., MB/s) and/or airtime values (e.g., length of time to send a MB of data) associated with the indirect configuration 210 (e.g., first communication link 22a and second communication link 22b) and the direct configuration 220

(e.g., third communication link 22c). Based on the data rates and/or airtime values, the media device 102 may select a preferred configuration and may instruct the device 110 to connect to the media device 102 using the preferred configuration. For example, if the direct configuration 220 offers faster data rates/lower airtime values, the media device 102 may select the direct configuration 220 and instruct the device 110 to connect to the first wireless network and stream the video data via the third communication link 22c. Thus, if the media device 102 is communicating with the device 110 using the direct configuration 220, the device 110 will begin streaming the video data (e.g., request that the media device 102 send the video data), whereas if the media device 102 is communicating with the device 110 using the indirect configuration 210, the device 110 will connect to the first wireless network prior to streaming the video data. As used herein, streaming video data refers to the device 110 requesting that the media device 102 send video data, the media device 102 sending the video data to the device 110 and the device 110 receiving the video data in order to display the video data on a display coupled to the device 110.

In order to determine the data rates and/or airtime values, the media device 102 may determine signal strengths associated with the first communication link 22a, the second communication link 22b and the third communication link 22c. For example, the media device 102 may measure a first received signal strength indication (RSSI) value of a signal from the AP 20 (e.g., first signal strength associated with the first communication link 22a) and measure a third RSSI value of a signal from the device 110 (e.g., a third signal strength associated with the third communication link 22c). However, the media device 102 is unable to measure a second RSSI value of a signal from the AP 20 as received by the device 110 (e.g., a second signal strength associated with the second communication link 22b). Instead, the media device 102 may send a request to the device 110 instructing the device 110 to send the second RSSI value to the media device 102.

As illustrated in FIG. 1, the media device 102 may determine (120) signal strengths (e.g., RSSI, SNR or the like) corresponding to links (e.g., first communication link 22a and third communication link 22c), may request (122) a signal strength corresponding to the second communication link from the device 110 and may receive (124) the signal strength corresponding to the second communication link from the device 110. The media device 102 may determine (126) congestion values for wireless networks, such as a first congestion value corresponding to first congestion on the first wireless network and a second congestion value corresponding to second congestion on the second wireless network. As will be described in greater detail below with regard to FIGS. 5-6, the media device 102 may determine the first congestion value by determining a percentage of unsuccessful channel access attempts to a total number of channel access attempts associated with the first wireless network. For example, the media device 102 may track the status of a clear channel assessment (CCA) register, which may store a CCA value indicating how many channel access attempts were unsuccessful compared to a total number of channel access attempts. If the first wireless network is less congested (e.g., lower congestion value) than the second wireless network, more data packets may be sent and received using the first wireless network in a fixed period of time, resulting in higher data rates and lower airtime values.

The media device 102 and the device 110 do not need to be connected to a wireless network to determine a signal strength value associated with a communication link. For example, the media device 102 may determine the first signal strength value associated with the first communication link 22a even when not connected to the second wireless network. Similarly, the media device 102 may determine the third signal strength value associated with the third communication link 22c when the device 110 is not connected to the first wireless network, and the device 110 may determine the second signal strength value associated with the second communication link 22b when the device 110 is not connected to the second wireless network. Further, the media device 102 may determine the second congestion value associated with the second wireless network even when not connected to the second wireless network. In some examples, the media device 102 may be connected to the second wireless network associated with the AP 10 while the device 110 is connected to the first wireless network associated with the media device 102.

The media device 102 may determine (128) a first available bandwidth of the first communication link 22a. For example, the media device 102 may multiply a first expected throughput (e.g., ideal throughput with no congestion under ideal circumstances) associated with the first communication link 22a by a first scaling factor (e.g., one minus the second congestion value associated with the second wireless network) to determine the first available bandwidth. The media device 102 may determine (130) a second available bandwidth of the second communication link 22b based on a second expected throughput associated with the second communication link and the first scaling factor. The media device 102 may determine (132) a third available bandwidth of the third communication link 22c. For example, the media device 102 may multiply a third expected throughput associated with the third communication link 22c by a second scaling factor (e.g., one minus the first congestion value associated with the first wireless network) to determine the third available bandwidth.

After determining the first available bandwidth, the second available bandwidth and the third available bandwidth, the media device 102 may determine (134) a first airtime value of the indirect configuration 210. For example, the media device 102 may sum a first reciprocal of the first available bandwidth and a second reciprocal of the second available bandwidth to determine the first airtime value. The media device 102 may determine (136) a second airtime value of the direct configuration 220. For example, the media device 102 may sum a third reciprocal of the third available bandwidth to determine the second airtime value. The media device 102 may determine (138) if the first airtime value is less than the second airtime value. If the first airtime value is lower, the media device 102 may select the indirect configuration 210 and send an instruction to the device 110 to connect to the media device 102 via the indirect configuration 210. If the first airtime value is not lower, the media device 102 may select the direct configuration 220 and send an instruction to the device 110 to connect to the media device 102 via the direct configuration 220.

While the flowchart illustrated in FIG. 1 refers to comparing the first airtime value to the second airtime value, the disclosure is not limited thereto. Instead, the media device 102 may compare a first data rate associated with the indirect configuration 210 to a second data rate associated with the direct configuration 220 without departing from the present disclosure.

Prior to the media device 102 selecting a preferred configuration, the media device 102 may communicate to the device 110 using either the indirect configuration 210 or the direct configuration 220. For example, the media device 102 and the device 110 may initially connect to the second wireless network associated with the AP 10, enabling the media device 102 to communicate with the device 110 to request the second signal strength value associated with the second communication link 22b and send an instruction to the device 110 to stream video data from the media device 102 using the preferred configuration. If the media device 102 selects the indirect configuration 210 as the preferred configuration, the device 110 may remain connected to the second wireless network and may send a request to the media device 102 to stream the video data. If the media device 102 selects the direct configuration 220 as the preferred configuration, the device 110 may connect to the first wireless network prior to sending the request to the media device 102 to stream the video data.

Additionally or alternatively, the device 110 may initially connect to the first wireless network associated with the media device 102, enabling the media device 102 to communicate directly with the device 110. If the media device 102 selects the direct configuration 220 as the preferred configuration, the device 110 may remain connected to the first wireless network and may send a request to the media device 102 to stream the video data. If the media device 102 selects the indirect configuration 210 as the preferred configuration, the device 110 may connect to the second wireless network prior to sending the request to the media device 102 to stream the video data.

To illustrate an example, the device 110 may connect to the second wireless network associated with the AP10 in order to stream remote content, such as television shows, movies or the like, from media servers online. When the device 110 wants to access local content stored on the media device 102, the device 110 may disconnect from the second wireless network and connect directly to the media device 102 via the first wireless network. In some situations, the media device 102 may determine that the indirect configuration 210 is preferable to the direct configuration 220 and may instruct the device 110 to connect to the media device 102 via the second wireless network. The media device 102 may then stream the local content to the device 110 using the indirect configuration 210.

FIG. 3 is a communication diagram that illustrates establishing a preferred connection according to embodiments of the present disclosure. As illustrated in FIG. 3, the media device 102 may initially communicate with the device 110 using an initial connection illustrated in step 310. For example, the device 110 may determine to access local content stored on the media device 102 and may connect directly to the media device 102. The media device 102 may perform steps 120-136, as described above with regard to FIG. 1, and may determine (320) a preferred configuration. For example, the media device 102 may determine that the preferred configuration is the indirect configuration 210 (e.g., the first airtime is lower than the second airtime) or the direct configuration 220 (e.g., the second airtime is lower than the first airtime). The media device 102 may send (322) an instruction to the device 110 instructing the device 110 to connect to the media device 102 using a preferred connection. For example, if the preferred configuration is the indirect configuration 210, the preferred connection is via the first communication link 22a and the second communication link 22b. If the preferred configuration is the direct configuration 220, the preferred connection is via the third communication link 22c. In response to the instruction, the device 110 may establish (324) the preferred connection and the media device 102 may communicate with the device 110 using the preferred connection illustrated in step 326.

Figure 4A:
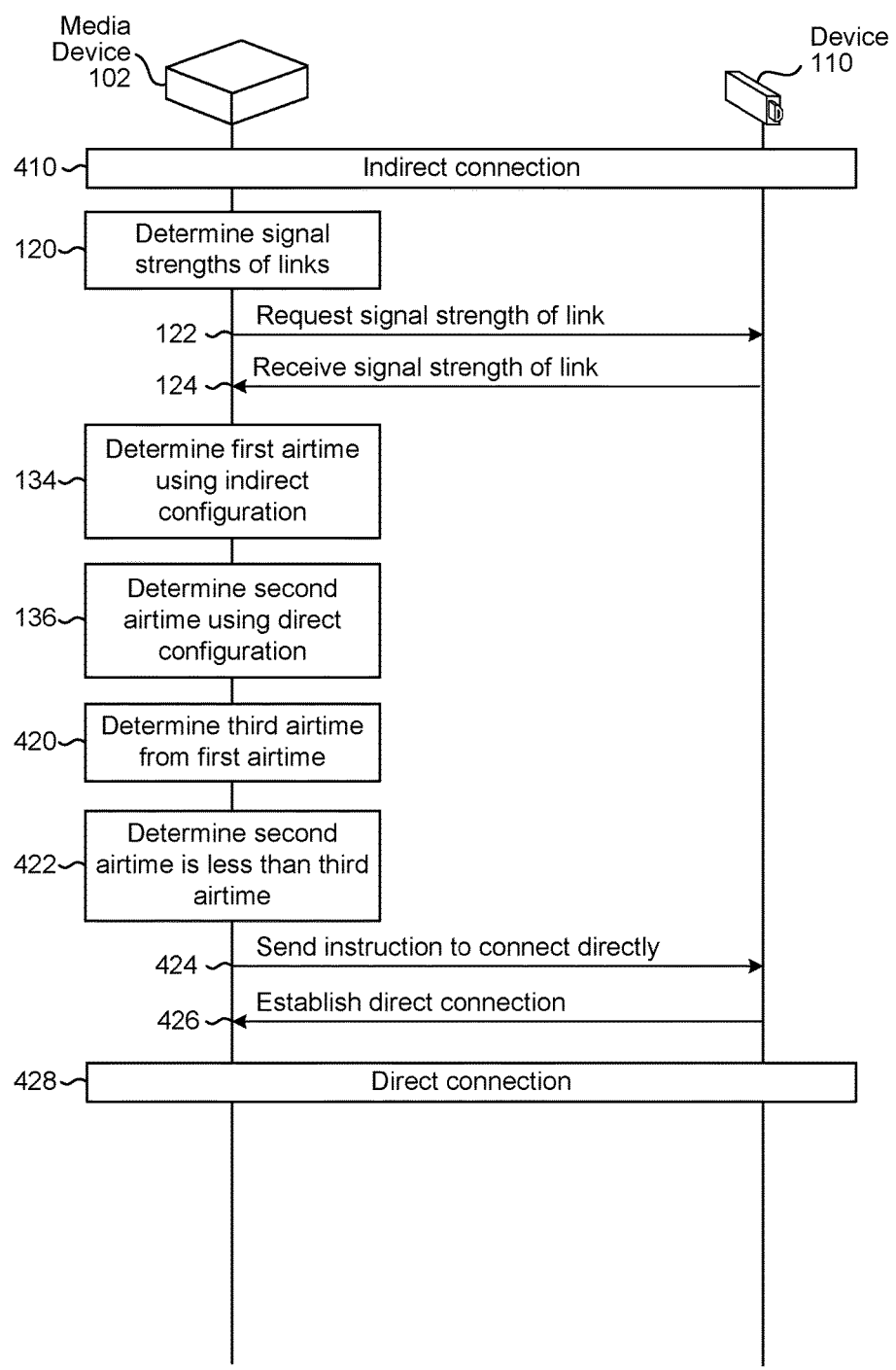

FIGS. 4A-4B are communication diagrams that illustrate modifying a preferred connection according to embodiments of the present disclosure. As illustrated in FIG. 4A, the media device 102 may communicate with the device 110 using an indirect connection in step 410. The media device 102 may perform steps 120-136, as described above with regard to FIG. 1, to determine the first airtime value associated with the indirect configuration and the second airtime value associated with the direct configuration. To prevent the media device 102 from switching back and forth between the indirect configuration and the direct configuration, once the media device 102 has selected a preferred configuration the media device 102 may take into account a threshold value to provide hysteresis. As illustrated in FIG. 4A, the media device 102 may determine (420) a third airtime value from the first airtime value, such as by subtracting the threshold value from the first airtime value. Thus, the second airtime value must be lower than the first airtime value by more than the threshold value in order for the media device 102 to switch from the indirect configuration to the direct configuration. While the second airtime value is above the third airtime value, the media device 102 may maintain the indirect configuration.

However, if the second airtime value becomes lower than the third airtime value, the media device 102 may determine (422) that the second airtime value is less than the third airtime value, may send (424) an instruction to the device 110 instructing the device 110 to connect to the media device 102 directly, the device 110 may establish (426) a direct connection via the third communication link 22c and the media device 102 may communicate with the device 102 via the third communication link 22c, as illustrated in step 428.

As illustrated in FIG. 4B, the media device 102 may communicate with the device 110 using a direct connection in step 450. The media device 102 may perform steps 120-136, as described above with regard to FIG. 1, to determine the first airtime value associated with the indirect configuration and the second airtime value associated with the direct configuration. To prevent the media device 102 from switching back and forth between the indirect configuration and the direct configuration, once the media device 102 has selected a preferred configuration the media device 102 may take into account a threshold value to provide hysteresis. As illustrated in FIG. 4B, the media device 102 may determine (460) a third airtime value from the second airtime value, such as by subtracting the threshold value from the second airtime value. Thus, the first airtime value must be lower than the second airtime value by more than the threshold value in order for the media device 102 to switch from the direct configuration to the indirect configuration. While the first airtime value is above the third airtime value, the media device 102 may maintain the direct configuration.

However, if the first airtime value becomes lower than the third airtime value, the media device 102 may determine (462) that the first airtime value is less than the third airtime value, may send (464) an instruction to the device 110 instructing the device 110 to connect to the media device 102 indirectly, the device 110 may establish (466) an indirect connection via the first communication link 22a and the second communication link 22b, and the media device 102 may communicate with the device 102 via the first communication link 22a and the second communication link 22b, as illustrated in step 468.

Figure 5:
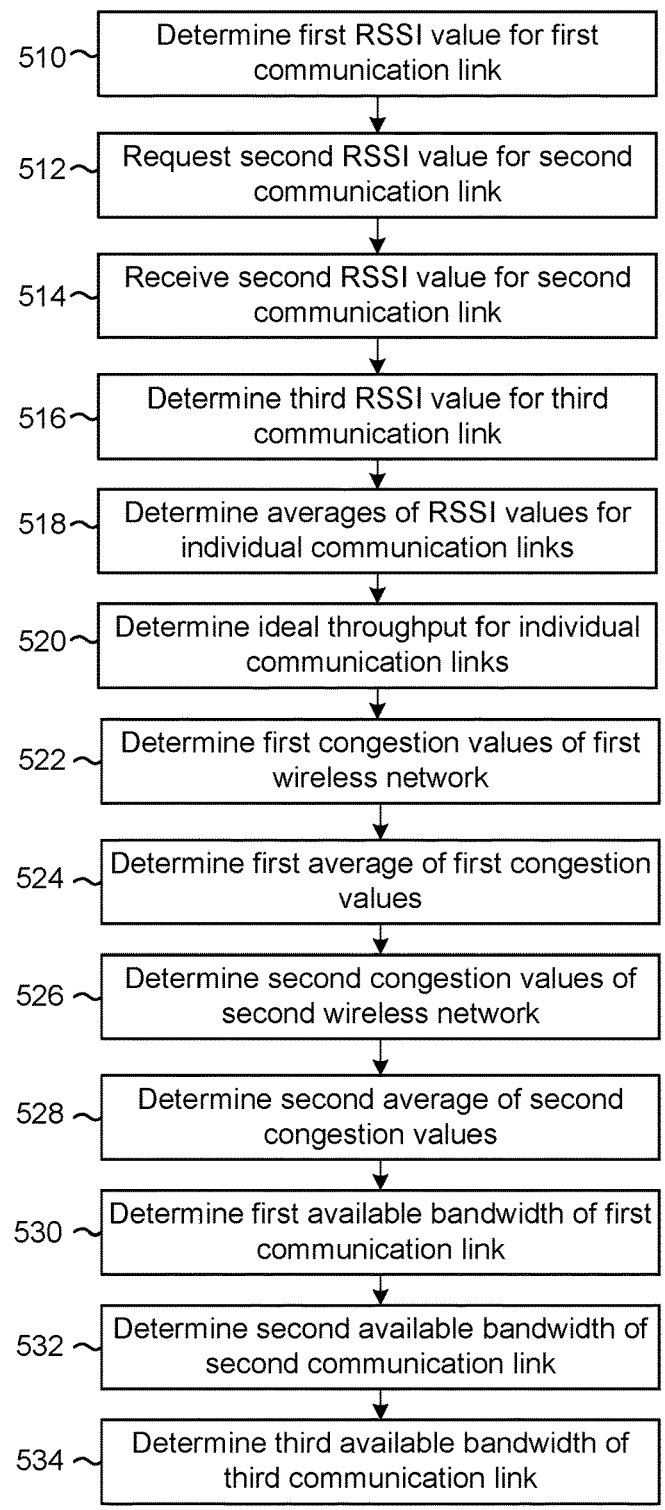
FIG. 5 is a flowchart conceptually illustrating an example method for determining available bandwidths according to embodiments of the present disclosure.

FIG. 5 is a flowchart conceptually illustrating an example method for determining available bandwidths according to embodiments of the present disclosure. As illustrated in FIG. 5, the media device 102 may determine (510) a first RSSI value for the first communication link 22a, may request (512) a second RSSI value for the second communication link 22b from the device 110, may receive (514) the second RSSI value for the second communication link 22b from the device 110 and may determine (516) a third RSSI value for the third communication link. The media device 102 may determine (518) averages of RSSI values for individual links. For example, the media device 102 may determine a first moving average of a first plurality of RSSI values associated with the first communication link 22a, a second moving average of a second plurality of RSSI values associated with the second communication link 22b and a third moving average of a third plurality of RSSI values associated with the third communication link 22c. The averages may include weighting factors, emphasizing more recent RSSI values or the like, using the following equation:

$$RSSI_n\_AVG = w_0 * RSSI_n[0] + w_1 * RSSI_n[1] + \ldots + w_K * RSSI_n[K] \qquad [1]$$

where n=1, 2, 3 corresponding to the communication links, K is the number of RSSI measurements taken into consideration for the moving average, and $w_0$ to $w_K$ are the weighting factors.

The media device 102 may determine (520) an ideal throughput for the individual communication links 22a/22b/22c. In some examples, the media device 102 may determine the ideal throughput using a lookup table and the average RSSI values. For example, the average RSSI values can be translated to an approximate Transmission Control Protocol (TCP) throughput, which can be achieved in a clean environment (e.g., no congestion on a particular wireless channel). An example of a lookup table is provided in Table 1.

TABLE 1

Example of ideal throughputs

| RSSI (dBm) | TSP TH (Mb/s) |
|---|---|
| −50 | 100 |
| −60 | 100 |
| −70 | 70 |
| −80 | 20 |
| −85 | 5 |
| −90 | 1 |

In some examples, the lookup table may take into account the device 110 and its wireless capability. This lookup table could be generated based on measured range-vs-rate diagrams, data sheet specifications, etc., and may be stored on the media device 102 or accessed from a remote device by the media device 102. However, the disclosure is not limited thereto and the media device 102 may determine the ideal throughput without using a lookup t able. For example, the media device 102 may use some signal quality metrics, such as modulation and coding scheme (MCS) index values, to determine the ideal throughput directly without using a lookup table, as the MCS index values may have a linear relationship with the ideal throughput.

The media device 102 may determine (520) first congestion values of the first wireless network, determine (524) a first average of the first congestion values, determine (526) second congestion values of the second wireless network and determine (528) a second average of the second congestion values. If the first wireless network is less congested (e.g., lower congestion value) than the second wireless network, more data packets may be sent and received using the first wireless network in a fixed period of time, resulting in higher data rates and lower airtime values using the first wireless network.

As an example, the congestion values may correspond to a clear channel assessment (CCA) value (which may be stored in a CCA register), which may indicate how many channel access attempts were unsuccessful compared to a total number of channel access attempts. For example, the device may attempt to access a channel to send a packet, but prior to sending the packet the device listens to the channel. If the channel has a current transmission (e.g., channel is busy because a different device is transmitting), the device waits to access the channel and this is referred to as an unsuccessful channel access. The device may increment both the CCA register and a cumulative register counting total channel access attempts by one. If the channel does not have a current transmission (e.g., channel is open), the device may send the packet and this is referred to as a successful channel access. The device does not increment the CCA register but increments the cumulative register by one.

To determine the congestion value, the device may periodically determine a status (e.g., a current value) of the CCA register and the cumulative register and calculate a ratio of unsuccessful channel access attempts to the total number of channel access attempts. As a simple example, a current value of the CCA register may be divided by a current value of the cumulative register, indicating a percentage of the time that the channel is busy. More commonly, however, the device may determine the number of unsuccessful/total channel access attempts over a period of time instead of using the current value stored in the registers. Thus, the device may periodically (e.g., every second) check the status of the registers and determine a difference for each register (e.g., current value minus previous value). For example, the device may determine a first value of the CCA register and a second value of the cumulative register at a first time and determine a third value of the CCA register and a fourth value of the cumulative register at a second time. To calculate the congestion value at the second time, the device may determine a first difference corresponding to the CCA register (e.g., third value minus first value) and a second difference corresponding to the cumulative register (e.g., fourth value minus second value) and divide the first difference by the second difference. For example, if 50 out of 100 channel access attempts are unsuccessful, the congestion value is 50%. The congestion value may be calculated as:

$$r_{CCA} = N_{CCA}/N_{total} \qquad [2]$$

where $r_{CCA}$ is the congestion value, $N_{CCA}$ is the number of unsuccessful channel access attempts and $N_{total}$ is the total number of channel access attempts.

In some examples, the device may calculate a weighted moving average over a period of time. While the device checks the registers periodically (e.g., every second), the weighted moving average may take into account a longer period of time encompassing multiple counter values. For example, the device may determine the congestion value based on a number of unsuccessful channel access attempts and a number of total channel access attempts in the past ten seconds. Additionally or alternatively, the device may assign lower weights to the older counter values, such that the previous congestion values are factored into the current congestion value while emphasizing the most recent updates to the registers. For example, the device may place a first weight on a first time period and a second weight on a second time period. As an illustration, the device may calculate a first difference corresponding to the CCA register and a second difference corresponding to the cumulative register at a first time and calculate a third difference corresponding to the CCA register and a fourth difference corresponding to the cumulative register at a second time. To determine the congestion value, the device may assign first weights (e.g., 1) to the first difference and the second difference and assign second weights (e.g., 2) to the third difference and the fourth difference. Thus, the congestion value associated with the first time period is weighted half as much as the congestion value associated with the second time period. The weighted moving average may be calculated as:

$$r_{CCA\_AVG} = m_0 * r_{CCA}[0] + m_1 * r_{CCA}[1] + \ldots + m_K * r_{CCA}[L] \quad [3]$$

where $r_{CCA\_AVG}$ is the moving average of congestion values, L is the number of $r_{CCA}$ measurements taken into consideration for the moving average, and $m_0$ to $m_K$ are the weighting factors. The media device 102 may calculate a first moving average for the first wireless network and a second moving average for the second wireless network.

The media device 102 may determine (530) a first available bandwidth associated with the first communication link 22a, determine (532) a second available bandwidth associated with the second communication link 22b and determine (534) a third available bandwidth associated with the third communication link 22c. For example, the media device 102 may multiply the first ideal throughput (e.g., ideal throughput with no congestion under ideal circumstances) associated with the first communication link 22a by a first scaling factor (e.g., one minus the second average of the second congestion values associated with the second wireless network) to determine the first available bandwidth. Similarly, the media device 102 may multiply the second ideal throughput associated with the second communication link 22b and the first scaling factor to determine the second available bandwidth. The media device 102 may multiply a third ideal throughput associated with the third communication link 22c by a second scaling factor (e.g., one minus the first average of the first congestion values associated with the first wireless network) to determine the third available bandwidth. Thus, the available bandwidths correspond to expected throughputs under non-ideal circumstances. The media device 102 may determine available bandwidth using the following equation:

$$TH_{cong} = TH_{clean}(1 - r_{CCA\_AVG}) \quad [4]$$

where $TH_{cong}$ is the available bandwidth, $TH_{clean}$ is the ideal throughput for the communication link and $r_{CCA\_AVG}$ is the moving average of congestion values for the wireless network.

In some examples, the media device 102 may determine data rates and/or airtime values based on a signal quality metric such as RSSI, as illustrated in FIG. 5. However, the disclosure is not limited to using RSSI to determine the data rates and/or airtime values. Instead, other examples of signal quality metrics include metrics that indicate a transmission quality of a link between the media device 102, the device 110 and/or the AP 20. Not all signal quality metrics are supported by all access points, but the signal quality metrics may include modulation and coding scheme (MCS) index values, transmit (Tx) statistics or receive (Rx) statistics or may be derivable from the Tx/Rx statistics. For example, Tx statistics may include retries count, multiple retries count, TX frame count, TX frame queued count, TX byte count, TX byte queued count, TX rate, TX rate history, Receive Success Rate (RTS) fail count, RTS success count, Acknowledgment (ACK) fail count or the like, Rx statistics may include current RSSI values, an average RSSI value, RX frame count, RX duplicated frame count, RX cyclic redundancy check (CRC) error count, RX rate, RX rate history, SYNC fail count or the like, and derivable statistics may include Packet Error Rate (PER), Bit Error Rate (BER), Signal to Noise Ratio (SNR) or the like. Several of the signal quality metrics listed above are associated with errors that occur when the media device 102 transmits a packet and the AP 20 does not receive the packet. As the AP 20 does not receive the packet, the media device 102 must retransmit the packet until the AP 20 receives the packet. Therefore, while a data rate between the media device 102 and the AP 20 may be high, a high number of errors (e.g., high error rate such as PER, BER, etc.) requires redundant transmissions of packets, resulting in a lower actual throughput of unique packets.

The media device 102 may determine (e.g., measure) some of the signal quality metrics without being directly linked to the device 110 and/or the AP 20. For example, the media device 102 may determine an RSSI value associated with a potential communication link (e.g., link 22c) between the media device 102 and the device 110 even when the media device 102 is not directly linked to the device 110 (e.g., the device 110 is not connected to the first wireless network). However, other signal quality metrics, such as the MCS index values, Tx statistics, and/or Rx statistics, may require that the media device 102 be directly linked to the device 110. As used herein, a "communication link" may refer to a potential communication link between the media device 102, the device 110 and/or the AP 20, even when data is not being sent using the communication link. For example, the media device 102 may be referred to as being connected to the device 110 via a communication link (e.g., link 22c) when the communication link is being used to send data between the media device 102 and the device 110 (e.g., when the device 110 is connected to the media device 102 via the first wireless network). In contrast, the media device 102 is not connected to the device 110 via the communication link (e.g., link 22c) when the communication link is not being used to send data (e.g., when the media device 102 measures an RSSI value prior to the device 110 connecting to the first wireless network).

In some examples, the media device 102 may determine data rates and/or airtime values based on measured data rates and/or measured airtime values. Thus, the media device 102 does not determine a preferred configuration solely based on signal strength data (e.g., current RSSI values, an average RSSI value, Signal to Noise Ratio (SNR) or the like), but instead determines the preferred configuration based on actual data rates, such as throughput rates or a physical layer (PHY) data rate determined using signal quality metrics.

In some examples, the media device 102 may determine data rates and/or airtime values based on a packet error rate (PER) value. While the PER value does not indicate to the media device 102 data rates/airtime values associated with other devices or potential data rates/airtime values that the other devices are capable of transmitting, the PER value may be used to determine how successful the media device 102 is in sending and receiving data using a communication link. For example, a low PER value corresponds to the media device 102 sending and receiving packets with few errors, whereas a higher PER value corresponds to the media device 102 sending and receiving packets with many errors and therefore having to retransmit packets that were not received. Thus, a first communication link that has a fast data rate but high PER value may actually send less data than a second communication link that has a slower data rate but low PER value, as the first communication link has to repeatedly retransmit packets that were not received. The media device 102 may determine the available bandwidth using the following equation:

$$TH_{cong} = TH_{clean}/(1+PER) \quad [5]$$

In some examples, prior to selecting the preferred configuration, the device 102 may determine an estimated data rate (e.g., expected throughput) based on assumptions associated with the hardware capabilities of the AP 20, the media device 102 and/or the device 110. After selecting the preferred configuration and establishing the preferred connection between the media device 102 and the device 110, the media device 102 may replace the estimated data rate with an actual data rate (e.g., actual throughput) determined based on data rates measured by the media device 102.

In some examples, in order to determine an actual data rate (e.g., actual throughput), the media device 102 may transmit packets to the AP 20, may receive an acknowledgment for received packets, may determine a first number of packets transmitted to the AP 20 and may determine a second number of packets received by the AP 20. For example, the media device 102 may transmit a first packet and a second packet to the AP 20 and receive an acknowledgement from the AP 20 that the first packet was received. As the media device 102 did not receive an acknowledgment from the AP 20 that the second packet was received, the media device 102 may determine that the first number of transmitted packets was two and the second number of received packets was one. The media device 102 may then determine a data rate using the first number of transmitted packets and the second number of received packets. For example, the media device 102 may use first signal quality metrics (e.g., TX frame count, TX rate, TX rate history or the like) available to the media device 102 to determine the first number of packets, may use second signal quality metrics (e.g., RX frame count, RX rate, RX rate history or the like) received from the AP 20 to determine the second number of packets, and may determine the data rate using the first signal quality metrics and the second signal quality metrics. The data rate may be the physical layer rate (PHY rate), which is the maximum data rate at which the media device 102 may communicate with the AP 20, or may be the throughput rate, which is the actual data rate at which the media device 102 communicates with the AP 20, although the disclosure is not limited thereto and the data rate may be application layer rate or the like without departing from the disclosure.

In some examples, the device 102 may determine the expected throughput (e.g., estimated data rate supported by both the media device 102 and the AP 20) and/or the actual throughput (e.g., actual data rate transmitted between the media device 102 and the AP 20) of the first communication link 22a. For example, prior to establishing the first communication link 22a, the media device 102 may determine an estimated data rate (e.g., expected throughput) based on assumptions associated with the hardware capabilities of the AP 20 and the media device 102, a RSSI or the like. After establishing the first communication link 22a, the media device 102 may replace the estimated data rate with an actual data rate (e.g., actual throughput) determined based on data rates measured by the device 102. Additionally or alternatively, the media device 102 may determine the expected throughput and/or the actual throughput associated with the second communication link 22b (between the AP 20 and the device 110) and/or the third communication link 22c (between the media device 102 and the device 110) using similar techniques.

In some examples, the media device 102 may determine a maximum supported data rate (PHYRate_Max) per channel of the second wireless network. For example, the media device 102 may determine the maximum supported data rate using a lookup table based on characteristics of the AP 20, such as a channel width and guard interval. An example of a lookup table is provided in Table 2.

TABLE 2

Example of 11ac PHY Rates for a Single Spatial Stream

| MCS | Modulation Type | Coding rate | 20 MHz channels | | 40 MHz channels | | 80 MHz channels | | 160 MHz | |
|---|---|---|---|---|---|---|---|---|---|---|
| | | | 800 ns GI | 400 ns GI | 800 ns GI | 400 ns GI | 800 ns GI | 400 ns GI | 800 ns GI | 400 ns GI |
| 0 | BPSK | 1/2 | 6.5 | 7.2 | 13.5 | 15 | 29.3 | 32.5 | 58.5 | 65 |
| 1 | QPSK | 1/2 | 13 | 14.4 | 27 | 30 | 58.5 | 65 | 117 | 130 |
| 2 | QPSK | 3/4 | 19.5 | 21.7 | 40.5 | 45 | 87.8 | 97.5 | 175.5 | 195 |
| 3 | 16-QAM | 1/2 | 26 | 28.9 | 54 | 60 | 117 | 130 | 234 | 260 |
| 4 | 16-QAM | 3/4 | 39 | 43.3 | 81 | 90 | 175.5 | 195 | 351 | 390 |
| 5 | 64-QAM | 2/3 | 52 | 57.8 | 108 | 120 | 234 | 260 | 468 | 520 |
| 6 | 64-QAM | 3/4 | 58.5 | 65 | 121.5 | 135 | 263.3 | 292.5 | 526.5 | 585 |
| 7 | 64-QAM | 5/6 | 65 | 72.2 | 135 | 150 | 292.5 | 325 | 585 | 650 |
| 8 | 256-QAM | 3/4 | 78 | 86.7 | 162 | 180 | 351 | 390 | 702 | 780 |
| 9 | 256-QAM | 5/6 | N/A | N/A | 180 | 200 | 390 | 433.3 | 780 | 866.7 |

In some examples, the media device 102 may determine a first number of channels supported by the AP 20, may determine a second number of channels supported by the media device 102 and may determine a stream number (SS_Num) as the lower of the first number and the second number. For example, the media device 102 may receive a first channel number indicating a maximum number of channels supported by the AP 20 from the AP 20, may determine a second channel number indicating a maximum number of channels supported by the media device 102 and may take the lower of the first channel number and the second channel number as the stream number, indicating the number of channels that will be used between the media device 102 and the AP 20.

In some examples, the device 102 may determine a signal strength value (e.g., RSSI value) associated with the first communication link 22a and may determine a scaling factor (RSSILvlFactor) using the signal strength. For example, the scaling factor (RSSILvlFactor) may scale the advertised data rate (PHYRate_Max) to a more realistic value using a lookup table. An example of a lookup table is provided in Table 3.

TABLE 3

Example of scaling factors

| RSSI Level | Range (dBm) | Scaling Factor |
| --- | --- | --- |
| High | >= −60 dBm | 0.7 |
| Medium | −60 dBm to −70 dBm | 0.6 |
| Low | <= −70 dBm | 0.5 |

The media device 102 may then determine an expected throughput (Exp_Thrpt). For example, the media device 102 may determine the expected throughput using the maximum supported data rate (PHYRate_Max), the stream number (SS_Num) and the scaling factor (RSSILvlFactor) using equation 6:

$$Exp\_Thrpt = RSSILvlFactor * PhyRate\_Max * SS\_N \quad [6]$$

After the initial connection, the expected throughput may be updated periodically using an actual throughput. For example, the device 102 may determine how many packets are transmitted and the data rate associated with each of the transmitted packets. Thus, the media device 102 may determine the actual throughput per spatial stream (e.g., channel) and determine the actual throughput using equation 7.

$$Act\_Thrpt\_SS = PhyRate\_n * NumPck\_n) / NumPck\_total(2)$$

$$Act\_Thrpt = \Sigma Act\_Thrpt\_SS\_n \quad [7]$$

The device 102 may determine a data rate (PhyRate_n) associated with a group of packets and may determine a product by multiplying the data rate by the number of packets (NumPck_n) in the group. The media device 102 may then determine if the media device 102 transmitted additional packets and may repeat the previous steps for the additional packets. If the media device 102 determines that there are no additional packets, the media device 102 may determine a sum of the products. For example, the media device 102 may determine a first number of packets transmitted at a first data rate and a second number of packets transmitted at a second data rate. The media device 102 may multiply the first number of packets by the first data rate to generate a first product and multiply the second number of packets by the second data rate to generate a second product. The media device 102 may then sum the first product and the second product.

The media device 102 may determine a total number of packets transmitted (NumPck_total). For example, the media device 102 may sum the first number of packets and the second number of packets. The media device 102 may then determine an actual throughput (Act_Thrpt). For example, the media device 102 may determine the actual throughput per spatial stream (Act_Thrpt_SS) using the scaling factor (RSSILvlFactor), the individual data rates (PhyRate_n), the individual number of packets (NumPck_n) and the total number of packets transmitted (NumPck_total) and equation 7. The media device 102 may then determine the actual throughput by summing the actual throughput per spatial stream for each spatial stream.

Figure 6:
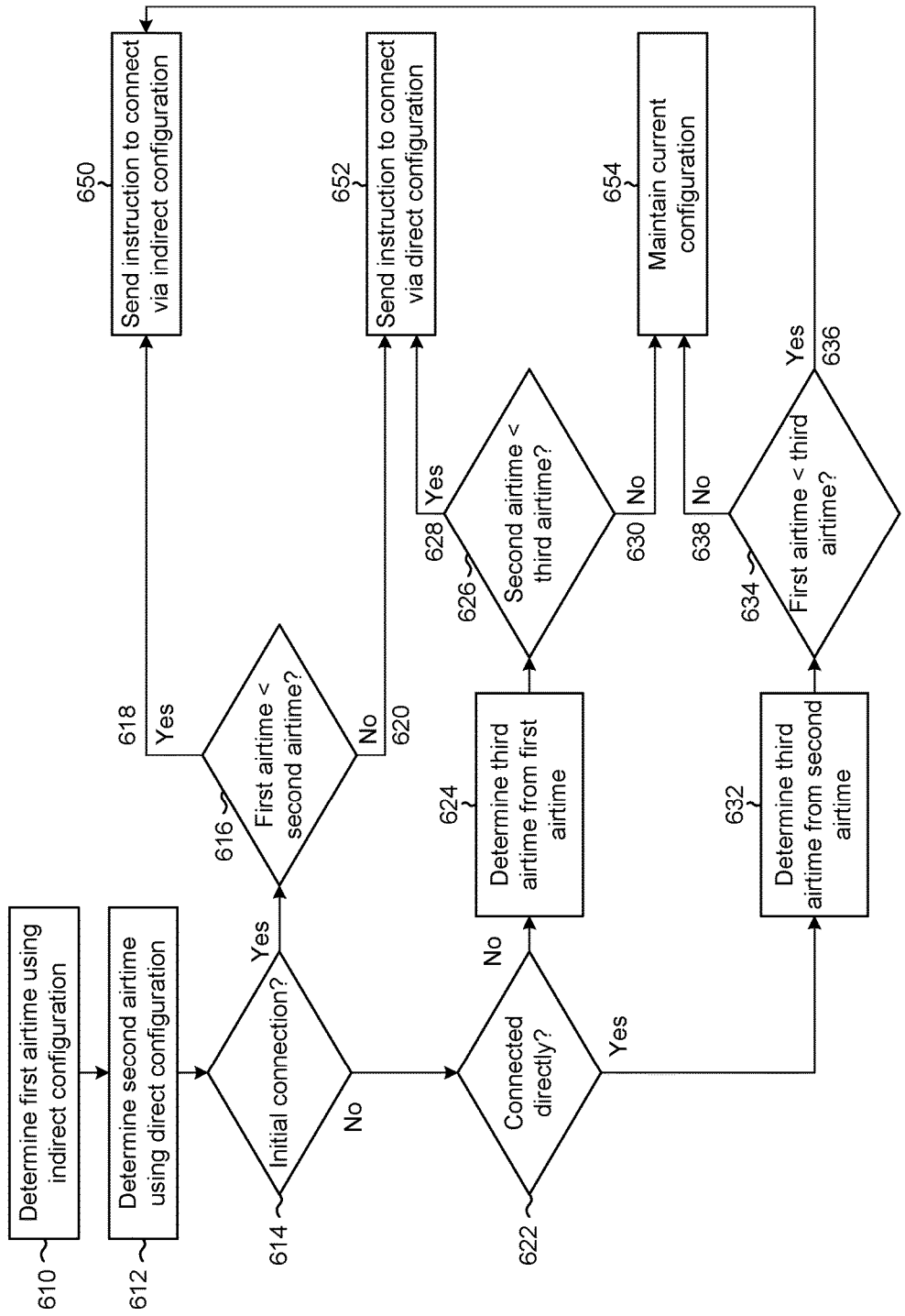
FIG. 6 is a flowchart conceptually illustrating an example method for selecting a preferred configuration according to embodiments of the present disclosure.

FIG. 6 is a flowchart conceptually illustrating an example method for selecting a preferred configuration according to embodiments of the present disclosure. As illustrated in FIG. 6, the media device 102 may determine (610) a first airtime value of the indirect configuration 210. For example, the media device 102 may sum a first reciprocal of the first available bandwidth and a second reciprocal of the second available bandwidth to determine the first airtime value, as shown in the following equation:

$$T_{air\_AP} = 1/TH_{cong1} + 1/TH_{cong2} \quad [8]$$

where $T_{air\_AP}$ is the first airtime value corresponding to the AP 20, $TH_{cong1}$ is the first available bandwidth and $TH_{cong2}$ is the second available bandwidth.

The media device 102 may determine (612) a second airtime value of the direct configuration 220. For example, the media device 102 may sum a third reciprocal of the third available bandwidth to determine the second airtime value, as shown in the following equation:

$$T_{air\_M} = 1/TH_{cong3} \quad [9]$$

where $T_{air\_M}$ is the second airtime value corresponding to the media device 102 and $TH_{cong3}$ is the third available bandwidth.

The media device 102 may determine (614) if the media device 102 is communicating with the device 110 in an initial connection (e.g., prior to determining a preferred configuration). If it is an initial connection, the media device 102 may determine (616) if the first airtime value is less than the second airtime value. If the first airtime value is lower, the media device 102 may loop (618) to step 650 and send (650) an instruction to the device 110 to connect to the media device 102 via the indirect configuration 210. If the first airtime value is not lower, the media device 102 may loop (620) to step 652 and send (652) an instruction to the device 110 to connect to the media device 102 via the direct configuration 220.

If the media device 102 determines in step 614 that it is not an initial connection, the media device 102 will incorporate a threshold value for hysteresis in order to prevent the media device 102 from switching between the direct configuration and the indirect configuration. As illustrated n FIG. 6, the media device 102 may determine (622) if the device 110 is connected directly to the media device 102. If the device 110 is not directly connected, the media device 102 may determine (624) a third airtime value by subtracting the threshold value from the first airtime value and determine (626) if the second airtime value is less than the third airtime value. If the second airtime value is less than the third airtime value, the media device 102 may loop (628) to step 652 and send (652) an instruction to the device 110 to connect to the media device 102 via the direct configuration 220. If the second airtime value is not less than the third airtime value, the media device 102 may loop (630) to step 654 and maintain (654) the current configuration.

If the device 110 is directly connected, the media device 102 may determine (632) a third airtime value by subtracting the threshold value from the second airtime value and determine (634) if the first airtime value is less than the third airtime value. If the first airtime value is less than the third airtime value, the media device 102 may loop (636) to step 650 and send (650) an instruction to the device 110 to connect to the media device 102 via the indirect configuration 210. If the first airtime value is not less than the third airtime value, the media device 102 may loop (638) to step 654 and maintain (654) the current configuration.

While not illustrated in FIG. 6, the example method illustrated in FIG. 6 may be performed repeatedly to continually determine whether to select the direct configuration or the indirect configuration. Thus, after the media device 102 determines to maintain the current configuration in step 654 and/or to change configurations in steps 650/652, the media device 102 may loop back and repeat step 610.

Figure 7:
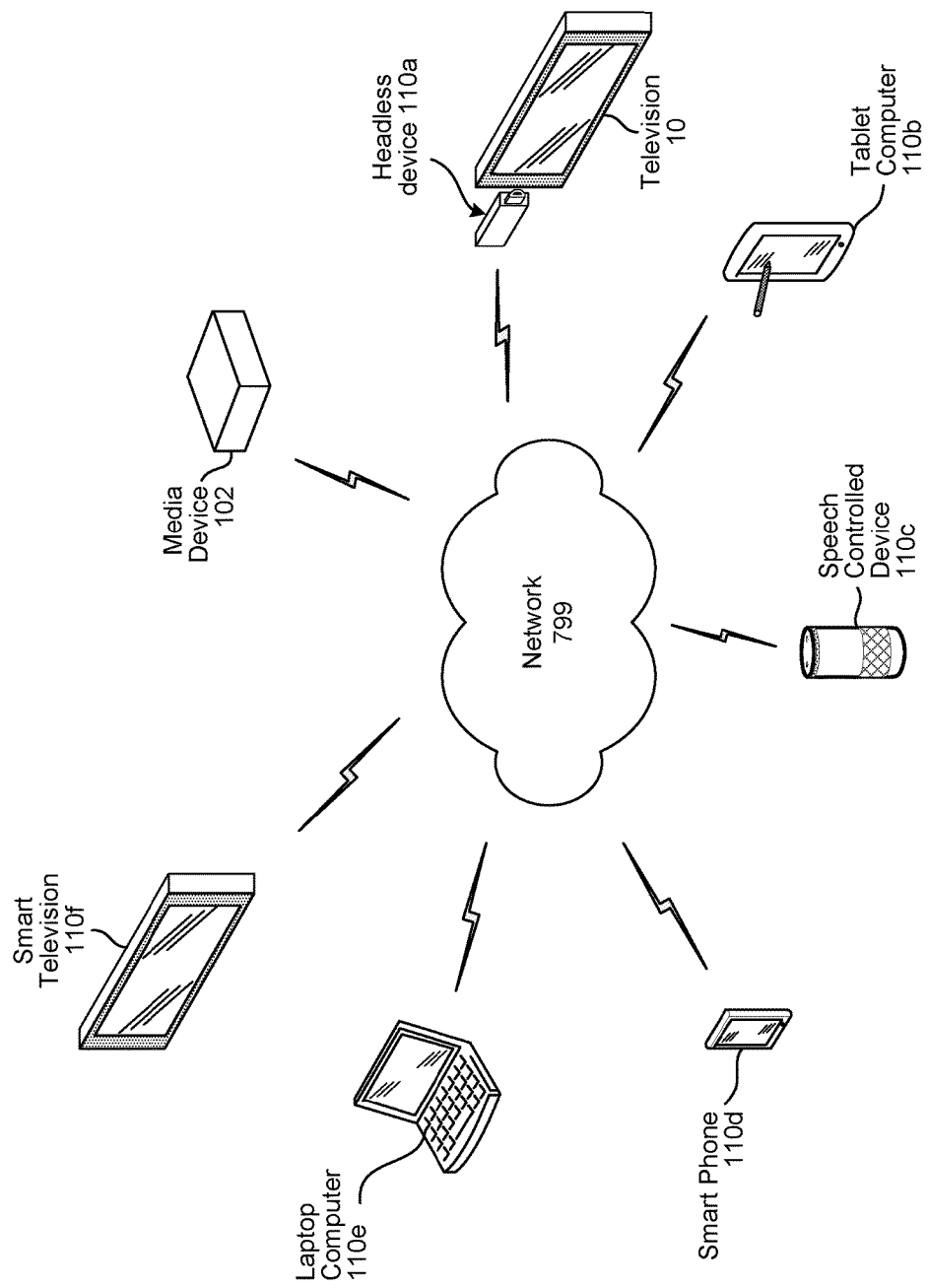
FIG. 7 illustrates an example of a computer network for use with the system.

As illustrated in FIG. 7 devices 102/110 may contain components of the system 100 and the devices 102/110 may be connected over a network 799. The network 799 may be a local or private network originating from the media device 102 and/or an access point (not shown). Devices may be connected to the network 799 through either wired or wireless connections. For example, a headless device 110a, a tablet computer 110b, a speech controlled device 110c, a smart phone 110d, a laptop computer 110e and/or a smart television 110f may be connected to the network 799 through a wireless connection.

Figure 8:
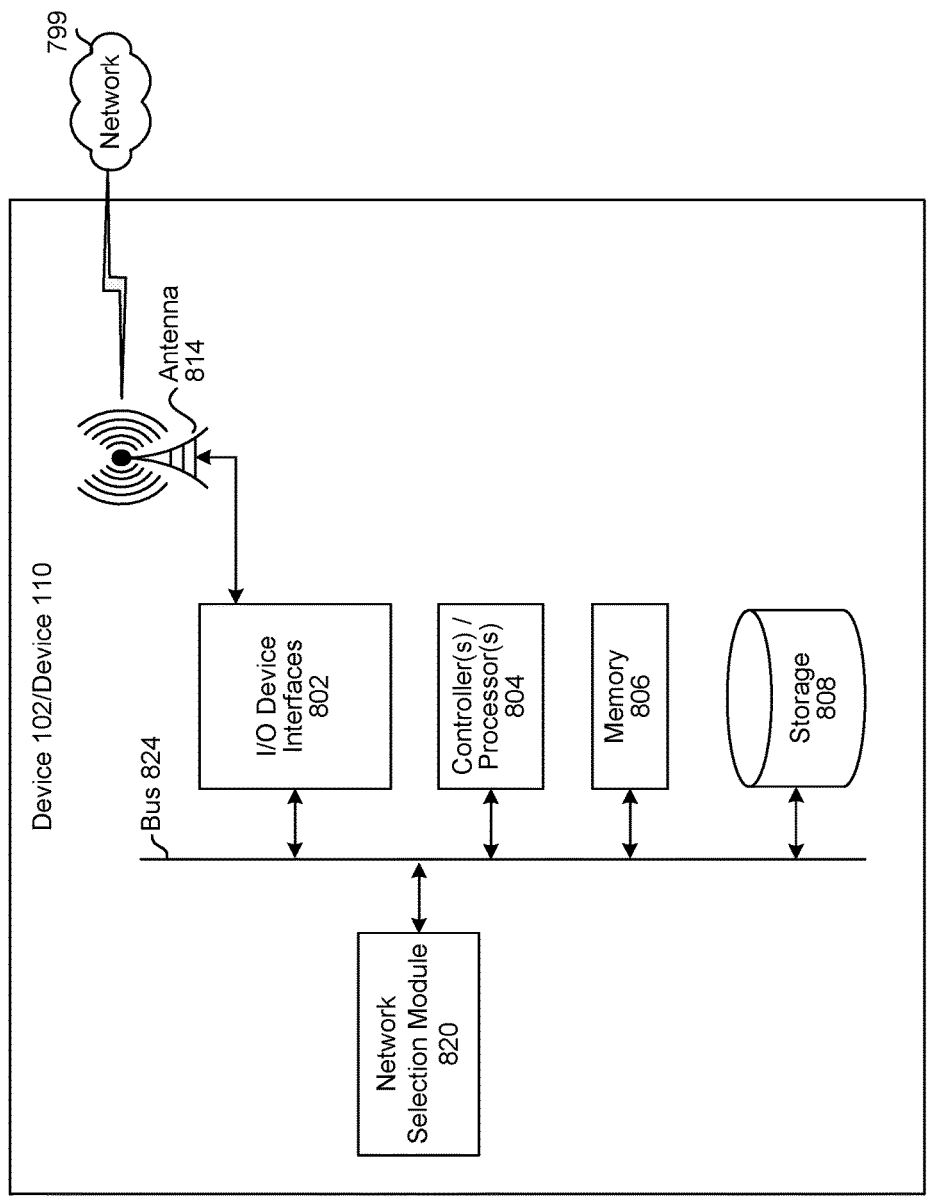
FIG. 8 is a block diagram conceptually illustrating example components of a device according to embodiments of the present disclosure.

FIG. 8 illustrates a block diagram conceptually illustrating example components of a device 102/110 according to the present embodiments. In operation, the device 102/110 may include computer-readable and computer-executable instructions that reside in storage 808 on the device 102/110. The device 102/110 may be an electronic device capable of connecting to a wireless network. Examples of electronic devices may include computers (e.g., a desktop, a laptop, a server or the like), portable devices (e.g., a camera, smart phone, tablet or the like), media devices (e.g., televisions, headless devices, video game consoles or the like) or the like. The device 102/110 may also be a component of any of the abovementioned devices or systems.

As illustrated in FIG. 8, the device 102/110 may include an address/data bus 824 for conveying data among components of the device 102/110. Each component within the device 102/110 may also be directly connected to other components in addition to (or instead of) being connected to other components across the bus 824.

The device 102/110 may include one or more controllers/processors 804 comprising one-or-more central processing units (CPUs) for processing data and computer-readable instructions and a memory 806 for storing data and instructions. The memory 806 may include volatile random access memory (RAM), non-volatile read only memory (ROM), non-volatile magnetoresistive (MRAM) and/or other types of memory. The device 102/110 may also include a data storage component 808 for storing data and processor-executable instructions. The data storage component 808 may include one or more non-volatile storage types such as magnetic storage, optical storage, solid-state storage, etc. The device 102/110 may also be connected to a removable or external non-volatile memory and/or storage (such as a removable memory card, memory key drive, networked storage, etc.) through the input/output device interfaces 802.

The device 102/110 includes input/output device interfaces 802. The input/output device interfaces 802 may be configured to operate with a network 799, for example a wireless local area network (WLAN) (such as WI-FI), BLUETOOTH, ZIGBEE and/or wireless networks, such as a Long Term Evolution (LTE) network, WIMAX network, 3G network, etc. The network 799 may include a local or private network or may include a wide network such as the internet. Devices may be connected to the network 799 through a wireless connection.

The input/output device interfaces 802 may also include an interface for an external peripheral device connection such as universal serial bus (USB), FIREWIRE, THUNDERBOLT, ETHERNET port or other connection protocol that may connect to networks 799.

The device 102/110 further includes a network selection module 820, which may comprise processor-executable instructions stored in storage 808 to be executed by controller(s)/processor(s) 804 (e.g., software, firmware), hardware, or some combination thereof. For example, components of the network selection module 820 may be part of a software application running in the foreground and/or background on the device 102/110. The network selection module 820 may control the device 102/110 as discussed above, for example with regard to FIGS. 1, 3, 4A-4B, 5, and/or 6. Some or all of the controllers/modules of the network selection module 820 may be executable instructions that may be embedded in hardware or firmware in addition to, or instead of, software. In one embodiment, the device 102/110 may operate using an ANDROID operating system (such as ANDROID 4.3 Jelly Bean, ANDROID 4.4 KITKAT or the like), an AMAZON Amazon operating system (such as FIREOS or the like), or any other suitable operating system.

Executable computer instructions for operating the device 102/110 and its various components may be executed by the controller(s)/processor(s) 804, using the memory 806 as temporary "working" storage at runtime. The executable instructions may be stored in a non-transitory manner in non-volatile memory 806, storage 808, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for dynamic network routing, the method comprising, by a media device capable of transmitting video data:
   determining, by the media device, a first signal strength value corresponding to a first wireless communication link between the media device and a tablet device, the first wireless communication link using a 5 GHz frequency band;
   determining a second signal strength value corresponding to a second wireless communication link between the media device and a wireless network access point, the second wireless communication link using a 2.4 GHz frequency band;
   sending, to the tablet device, a request for a third signal strength value corresponding to a third wireless communication link between the tablet device and the wireless network access point, the third wireless communication link using the 2.4 GHz band;
   receiving, from the tablet device, the third signal strength value;
   determining a first clear channel assessment (CCA) value corresponding to the 5 GHz frequency band, the first CCA value indicating a first percentage of unsuccessful channel access attempts to total channel access attempts using the first wireless communication link;
   determining a second CCA value corresponding to the 2.4 GHz frequency band, the second CCA value indicating a second percentage of unsuccessful channel access attempts to total channel access attempts using the second wireless communication link;
   determining, using the first signal strength value and the first CCA value, a first bandwidth corresponding to the first wireless communication link;
   determining, using the second signal strength value and the second CCA value, a second bandwidth corresponding to the second wireless communication link;
   determining, using the third signal strength value and the second CCA value, a third bandwidth corresponding to the third wireless communication link;
   determining, using the first bandwidth, a first airtime value indicating a first duration of time required to transmit a unit of data from the media device to the tablet device via the first wireless communication link;
   determining, using the second bandwidth and the third bandwidth, a second airtime value indicating a second duration of time required to transmit the unit of data from the media device to the tablet device via the second wireless communication link and the third wireless communication link;
   determining that the first airtime value is lower than the second airtime value;
   sending an instruction to the tablet device to connect to the media device via the first wireless communication link; and
   sending video data to the tablet device via the first wireless communication link.

2. The computer-implemented method of claim 1, further comprising:
   determining a third airtime value by subtracting a first hysteresis threshold from the first airtime value, the first hysteresis threshold corresponding to a percentage of the third airtime value;
   determining that the second airtime value is less than the third airtime value;
   sending a second instruction to the tablet device to connect to the media device via the third wireless communication link; and
   sending the video data to the tablet device via the third wireless communication link.

3. The computer-implemented method of claim 1, further comprising:
   determining, over a period of time, a first plurality of signal strength values for the first wireless communication link;
   determining a first average value of the first plurality of signal strength values;
   determining, using a lookup table, a first throughput value corresponding to the first average value;
   determining, over the period of time, a first plurality of CCA values corresponding to the 5 GHz frequency band, the first plurality of CCA values including the first CCA value;
   determining a second average value of the first plurality of CCA values; and
   determining, using the first throughput value and the second average value, the first bandwidth corresponding to the first wireless communication link.

4. The computer-implemented method of claim 1, wherein:
 determining the first airtime value further comprises taking a first reciprocal of the first bandwidth; and
 determining the second airtime value further comprises summing a second reciprocal of the second bandwidth and a third reciprocal of the third bandwidth.

5. A computer-implemented method for implementation by a first device, comprising:
 determining, by the first device, a first signal strength value corresponding to a first wireless communication link between the first device and a second device in a first frequency band;
 determining a second signal strength value corresponding to a second wireless communication link between the first device and an access point in a second frequency band;
 sending, to the second device, a request for a third signal strength value corresponding to a third wireless communication link between the second device and the access point in the second frequency band;
 receiving, from the second device, the third signal strength value;
 determining a first airtime value indicating a first time duration to transmit a unit of data from the first device to the second device via the first wireless communication link;
 determining a second airtime value indicating a second time duration to transmit the unit of data from the first device to the second device via the second wireless communication link and the third wireless communication link;
 determining that the first airtime value is lower than the second airtime value;
 sending an instruction to the second device to connect to the first device via the first wireless communication link; and
 sending video data to the second device via the first wireless communication link.

6. The computer-implemented method of claim 5, further comprising:
 determining a third airtime value by subtracting a hysteresis threshold from the first airtime value;
 determining that the second airtime value is less than the third airtime value;
 sending a second instruction to the second device to connect to the first device via the second wireless communication link and the third wireless communication link; and
 sending the video data to the second device via the second wireless communication link and the third wireless communication link.

7. The computer-implemented method of claim 5, further comprising:
 determining that the second airtime value is lower than the first airtime value;
 sending a second instruction to the second device to connect to the first device via the second wireless communication link and the third wireless communication link; and
 sending video data to the second device via the second wireless communication link and the third wireless communication link.

8. The computer-implemented method of claim 7, further comprising:
 determining a third airtime value by subtracting a hysteresis threshold from the second airtime value;
 determining that the first airtime value is less than the third airtime value;
 sending a third instruction to the second device to connect to the first device via the first wireless communication link; and
 sending the video data to the second device via the first wireless communication link.

9. The computer-implemented method of claim 5, further comprising:
 determining a first congestion value corresponding to the first frequency band;
 determining a second congestion value corresponding to the second frequency band;
 determining, using the first signal strength value and the first congestion value, a first bandwidth corresponding to the first wireless communication link;
 determining, using the second signal strength value and the second congestion value, a second bandwidth corresponding to the second wireless communication link; and
 determining, using the third signal strength value and the second congestion value, a third bandwidth corresponding to the third wireless communication link.

10. The computer-implemented method of claim 9, wherein:
 determining the first airtime value further comprises taking a first reciprocal of the first bandwidth; and
 determining the second airtime value further comprises summing a second reciprocal of the second bandwidth and a third reciprocal of the third bandwidth.

11. The computer-implemented method of claim 9, wherein determining the first congestion value further comprises:
 determining a first number of unsuccessful channel access attempts associated with the first frequency band over a first period of time;
 determining a second number of total channel access attempts associated with the first frequency band over the first period of time; and
 determining the first congestion value by dividing the first number by the second number.

12. The computer-implemented method of claim 5, further comprising:
 determining, over a period of time, a first plurality of signal strength values corresponding to the first wireless communication link, the first plurality of signal strength values including the first signal strength value;
 determining a first average value of the first plurality of signal strength values;
 determining, using a lookup table, a first throughput value corresponding to the first average value;
 determining, over the period of time, a first plurality of congestion values corresponding to the first frequency band, the first plurality of congestion values including the first congestion value;
 determining a second average value of the first plurality of congestion values;
 determining, using the first throughput value and the second average value, a first bandwidth corresponding to the first wireless communication link; and
 determining the first airtime value based on the first bandwidth.

13. A device, comprising:
 at least one processor;
 a memory device including instructions operable to be executed by the at least one processor to configure the device to:

determine a first signal strength value corresponding to a first wireless communication link between the device and a second device in a first frequency band;

determine a second signal strength value corresponding to a second wireless communication link between the device and an access point in a second frequency band;

send, to the second device, a request for a third signal strength value corresponding to a third wireless communication link between the second device and the access point in the second frequency band;

receive, from the second device, the third signal strength value;

determine a first airtime value indicating a first time duration required to transmit a unit of data from the device to the second device via the first wireless communication link;

determine a second airtime value indicating a second time duration required to transmit the unit of data from the device to the second device the second wireless communication link and the third wireless communication link;

determine that the second airtime value is lower than the first airtime value;

send an instruction to the second device to connect to the device via the second wireless communication link and the third wireless communication link; and send video data to the second device via the second wireless communication link and the third wireless communication link.

14. The device of claim 13, wherein the instructions further configure the device to:

determine that the first airtime value is lower than the second airtime value;

send a second instruction to the second device to connect to the device via the first wireless communication link; and send video data to the second device via the first wireless communication link.

15. The device of claim 14, wherein the instructions further configure the device to:

determine a third airtime value by subtracting a hysteresis threshold from the first airtime value;

determine that the second airtime value is less than the third airtime value;

send a third instruction to the second device to connect to the device via the second wireless communication link and the third wireless communication link; and send the video data to the second device via the second wireless communication link and the third wireless communication link.

16. The device of claim 13, wherein the instructions further configure the device to:

determine a third airtime value by subtracting a hysteresis threshold from the second airtime value;

determine that the first airtime value is less than the third airtime value;

send a second instruction to the second device to connect to the device via the first wireless communication link; and send the video data to the second device via the first wireless communication link.

17. The device of claim 13, wherein the instructions further configure the device to:

determine a first congestion value corresponding to the first frequency band;

determine a second congestion value corresponding to the second frequency band;

determine, using the first signal strength value and the first congestion value, a first bandwidth corresponding to the first wireless communication link;

determine, using the second signal strength value and the second congestion value, a second bandwidth corresponding to the second wireless communication link; and determine, using the third signal strength value and the second congestion value, a third bandwidth corresponding to the third wireless communication link.

18. The device of claim 17, wherein the instructions further configure the device to:

determine the first airtime value by taking a first reciprocal of the first bandwidth; and determine the second airtime value by summing a second reciprocal of the second bandwidth and a third reciprocal of the third bandwidth.

19. The device of claim 17, wherein the instructions further configure the device to:

determine a first number of unsuccessful channel access attempts associated with the first frequency band over a first period of time;

determine a second number of total channel access attempts associated with the first frequency band over the first period of time; and determine the first congestion value by dividing the first number by the second number.

20. The device of claim 13, wherein the instructions further configure the device to:

determine, over a period of time, a first plurality of signal strength values corresponding to the first wireless communication link, the first plurality of signal strength values including the first signal strength value;

determine a first average value of the first plurality of signal strength values;

determine, using a lookup table, a first throughput value corresponding to the first average value;

determine, over the period of time, a first plurality of congestion values corresponding to the first frequency band, the first plurality of congestion values including the first congestion value;

determine a second average value of the first plurality of congestion values;

determine, using the first throughput value and the second average value, a first bandwidth corresponding to the first wireless communication link; and determine the first airtime value based on the first bandwidth.

* * * * *